(12) United States Patent
Singh et al.

(10) Patent No.: US 10,328,670 B2
(45) Date of Patent: Jun. 25, 2019

(54) CARTON SEALING SECURITY TAPE

(71) Applicant: Intertape Polymer Corp., Sarasota, FL (US)

(72) Inventors: Sanjeev Singh, Saint Laurent, CA (US); Ronald J. Horwitz, Palm Harbor, FL (US); John K. Tynan, Jr., Marysville, MI (US)

(73) Assignee: Intertape Polymer Corp., Sarasota, FL (US)

( * ) Notice: Subject to any disclaimer, the term of this patent is extended or adjusted under 35 U.S.C. 154(b) by 0 days.

(21) Appl. No.: 15/266,123

(22) Filed: Sep. 15, 2016

(65) Prior Publication Data

US 2017/0080684 A1 Mar. 23, 2017

Related U.S. Application Data

(60) Provisional application No. 62/245,596, filed on Oct. 23, 2015, provisional application No. 62/219,692, filed on Sep. 17, 2015.

(51) Int. Cl.
*B32B 7/12* (2006.01)
*B32B 27/10* (2006.01)
(Continued)

(52) U.S. Cl.
CPC ............... *B32B 7/12* (2013.01); *B32B 3/10* (2013.01); *B32B 3/14* (2013.01); *B32B 5/02* (2013.01);
(Continued)

(58) Field of Classification Search
CPC ......... B32B 27/06; B32B 27/02; B32B 27/08; B32B 27/10; B32B 27/304; B32B 27/32;
(Continued)

(56) References Cited

U.S. PATENT DOCUMENTS 3,503,568 A * 3/1970 Galley ................... B65H 75/28
206/813
3,864,855 A 2/1975 Pekko et al.
(Continued)

FOREIGN PATENT DOCUMENTS

GB 2356958 6/2001

OTHER PUBLICATIONS

PCT, International Search Report and Written Opinion; Patent Application No. PCT/US2016/052044; 8 pages (dated Dec. 9, 2016).

*Primary Examiner* — Patricia L. Nordmeyer
(74) *Attorney, Agent, or Firm* — Moore & Van Allen PLLC; Jeffrey R. Gray

(57) ABSTRACT

Security tapes are disclosed that include a first substrate having a first major surface covered with a first PSA, a plurality of discrete pieces of second substrate laminated to the first major surface of the first substrate by the first PSA, and a second PSA applied to each of the plurality of discrete pieces of second substrate on a first surface opposite the first substrate. The first substrate is continuous in both the machine and transverse directions. Each discrete piece of second substrate has a length oriented in the transverse direction and may be spaced a distance apart, in the machine direction, from each adjacent piece of second substrate. The first adhesion of the first PSA for each of the discrete pieces of second substrate is less than a second adhesion of the second PSA for a packaging material or packaging carton.

20 Claims, 8 Drawing Sheets

(51) Int. Cl.
*B32B 3/10* (2006.01)
*B32B 27/06* (2006.01)
*B32B 29/00* (2006.01)
*B32B 5/02* (2006.01)
*B32B 7/02* (2019.01)
*B32B 27/08* (2006.01)
*B32B 27/30* (2006.01)
*B32B 27/32* (2006.01)
*B32B 27/36* (2006.01)
*B32B 3/14* (2006.01)

(52) U.S. Cl.
CPC ............... *B32B 7/02* (2013.01); *B32B 27/06* (2013.01); *B32B 27/08* (2013.01); *B32B 27/10* (2013.01); *B32B 27/304* (2013.01); *B32B 27/32* (2013.01); *B32B 27/36* (2013.01); *B32B 29/002* (2013.01); *B32B 2260/028* (2013.01); *B32B 2307/412* (2013.01); *B32B 2307/422* (2013.01); *B32B 2307/518* (2013.01); *B32B 2307/748* (2013.01); *B32B 2405/00* (2013.01); *B65D 2101/0007* (2013.01)

(58) Field of Classification Search
CPC ....... B32B 27/36; B32B 27/12; B32B 29/002; B32B 5/02; B32B 3/10; B32B 3/14; B32B 2307/518; B32B 2307/412; B32B 2307/748; B32B 2307/422; B32B 2405/00; B32B 2260/028; B32B 7/12; B32B 7/02; B65D 2101/0007; Y10T 428/14; Y10T 428/28

See application file for complete search history.

(56) References Cited

U.S. PATENT DOCUMENTS

| | | | |
|---|---|---|---|
| 4,041,202 A | 8/1977 | Williams | |
| 4,351,877 A | 9/1982 | Williams | |
| 4,604,153 A * | 8/1986 | Melbye | B05C 17/06 156/235 |
| 4,652,473 A | 3/1987 | Han | |
| 6,503,620 B1 * | 1/2003 | Xie | B32B 7/06 428/354 |
| 7,311,956 B2 * | 12/2007 | Pitzen | B44C 1/105 156/227 |
| 7,767,295 B2 | 8/2010 | Steinzor | |
| 2005/0084641 A1 * | 4/2005 | Downs | B42D 5/002 428/42.3 |
| 2009/0000972 A1 | 1/2009 | Bartusiak | |
| 2010/0181371 A1 * | 7/2010 | Messmer | B65D 5/4233 229/102 |
| 2014/0011024 A1 | 1/2014 | Graney et al. | |

\* cited by examiner

A. Make the subtape machine direction

B. Make the minitapes reciprocating blade or rotating blade machine direction

C. Laminate the Subtape to the Minitapes

D. Optionally, remove the "sacrificial" release liner

Security tape structure of FIG. 2 results

CARTON SEALING SECURITY TAPE

RELATED APPLICATIONS

This application claims the benefit of U.S. Provisional Application No. 62/245,596, filed Oct. 23, 2015, and U.S. Provisional Application No. 62/219,692, filed Sep. 17, 2015.

TECHNICAL FIELD

The present invention relates to an adhesive tape, more particularly a carton sealing tape with security or tamper resistant features.

BACKGROUND OF THE INVENTION

Various types and styles of carton sealing tapes are available to construct and seal corrugated boxes, fiberboard cartons, or other types of packages or containers. Certain of these carton sealing tapes purport to be security tapes; however, these tapes are not particularly tamper-proof. Many of these existing security tapes may be easily lifted and removed to allow intrusion into the package or container and reapplied with little indication of tampering or other nefarious activities. These existing security tapes do little to deter or prevent tampering and often leave little evidence of tampering that has occurred.

Better security tapes that more clearly evidence tampering are needed.

SUMMARY OF THE INVENTION

According to one aspect, an adhesive tape is disclosed that includes a first substrate continuous in both a machine direction and a transverse direction and having a first major surface covered with a first pressure sensitive adhesive, a plurality of discrete pieces of second substrate laminated to the first major surface of the first substrate by the first pressure sensitive adhesive, and a second pressure sensitive adhesive applied to each of the plurality of discrete pieces of second substrate on a first surface opposite the first substrate. Each of the plurality of discrete pieces of second substrate is spaced a distance apart in the machine direction from each immediately adjacent discrete piece of second substrate. A first adhesion of the first pressure sensitive adhesive for each of the plurality of discrete pieces of second substrate is less than a second adhesion of the second pressure sensitive adhesive on each of the plurality of discrete pieces of second substrate for a cardboard adherend.

In another aspect, the first substrate is selected from the group consisting of biaxially oriented polypropylene, polyethylene terephthalate, unplasticized vinyl chloride, and polyethylene. In another aspect, the first substrate is a transparent film. In another aspect, each of the plurality of discrete pieces of second substrate is a paper. In another aspect, each of the plurality of discrete pieces of second substrate is a saturated paper. In another aspect, each of the plurality of discrete pieces of second substrate is one or more of a filament, fiber, or polymeric film.

In another aspect of the previous embodiments, the first substrate has a first release layer applied to a second major surface thereof. The second major surface faces in a direction opposite the first major surface. In another aspect of the previous embodiments, each of the plurality of discrete pieces of second substrate has a second release layer applied to a second surface of the discrete piece of second substrate, said second surface facing towards the first substrate. The second release layer is positioned between each of the plurality of discrete pieces of second substrate and the first adhesive.

In another aspect of the previous embodiments, the first major surface of the first substrate includes a low surface-energy indicia printed thereon such that removal of the first substrate from the plurality of discrete pieces of second substrate reveals the indicia in the form of an adhesive residue.

In another aspect of the previous embodiments, the adhesive tape includes a taggant applied to one or more of the first substrate, first adhesive, one or more of the plurality of discrete pieces of second substrate, second adhesive, first release coating, and the second release coating. In another aspect, the taggant is visible by a human eye. In another aspect, the taggant is a microscopic and/or fluorescent taggant.

In another aspect of the previous embodiments, one or more of the plurality of discrete pieces of second substrate form a repeating pattern of one or more variations in shape, width, length, color, material, and topography.

In another aspect, once the adhesive tape is applied to a seam of a cardboard carton, the first substrate is removable from the plurality of discrete pieces of second substrate without removing the plurality of discrete pieces of second substrate from the cardboard carton. In another aspect, upon removal of the first substrate, the plurality of discrete pieces of second substrate remain intact and adhered to the cardboard carton across the seam.

According to another aspect, a tape is disclosed that includes a backing having a first major surface and a second major surface, a first adhesive applied to the second major surface of the backing, a security layer adhered to the first adhesive, and a second adhesive applied to the security layer. The security layer includes a plurality of discrete pieces of paper oriented transverse to a machine direction of the tape, and each of the plurality of discrete pieces of paper is spaced a distance apart in the machine direction from each immediately adjacent one of the plurality of discrete pieces of paper. A first adhesion of the first adhesive between the backing and the security layer is less than a second adhesion of the second adhesive between the security layer and a substrate.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
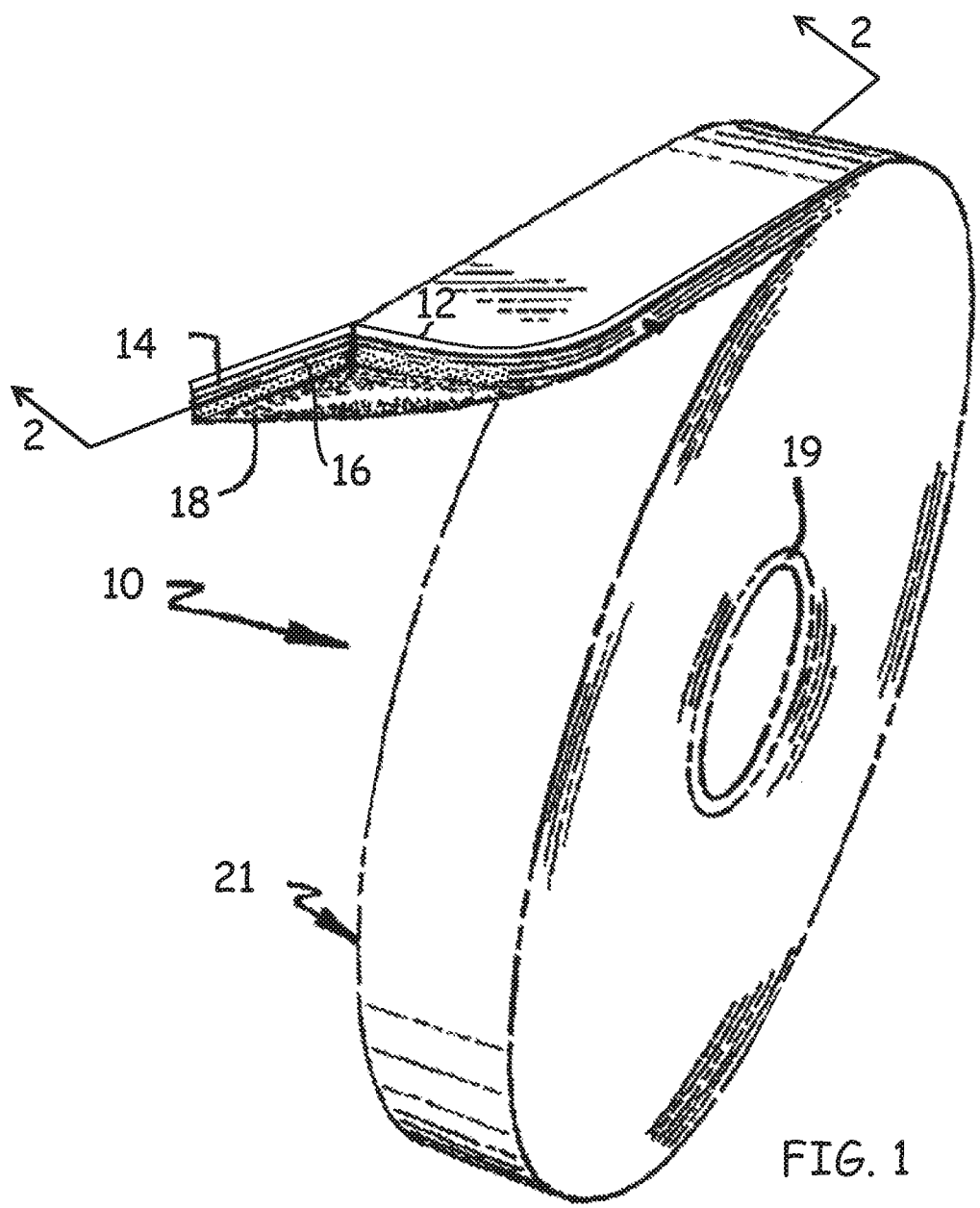
FIG. 1 is a perspective view of a roll of security tape wound on a core.

The following detailed description will illustrate the general principles of the invention, examples of which are additionally illustrated in the accompanying drawings. In the drawings, like reference numbers indicate identical or functionally similar elements.

As used herein, "adhesive tape" encompasses all sheet-like structures, such as two-dimensionally extended films or film sections, tapes with extended length and limited width, tape sections and the like, die cuts, labels, and another shape or construction that can have an adhesive on at least one major surface thereof, but tapes of extended length, in particular provided as a roll of tape 21, such as illustrated in FIG. 1 wound onto a core 19, are preferred.

Referring now to FIGS. 1-6, the adhesive tapes 10, 10', and 10" (referred to hereinafter as security tape) include a first substrate 12, a first adhesive layer 14, a second substrate layer 16 defined by a plurality of discrete pieces of a substrate material 24, and a second adhesive layer 18 or 18'. The first substrate 12 has a first major surface 20 and a second major surface 22. The first adhesive layer 14 is applied to the second major surface 22 of the first substrate 12. Each of the plurality of discrete pieces of substrate material 24 have a first surface 28 facing generally toward the first substrate 12 and adhered to the first adhesive layer 14 and a second surface 30 facing generally away from the first substrate 12. The second adhesive layer 18, 18' is applied to the second surface 30 of each of the discrete pieces of substrate material 24 for adhering the security tape 10, 10', or 10" to a carton (reference number 38 in FIG. 7), typically made of cardboard. The security tape may be a carton/case sealing tape, but is not limited thereto.

The first substrate 12 is continuous in both a machine direction and a transverse direction of the adhesive tapes 10, 10', and 10". The first substrate 12 may be referred to herein in the alternative as a carrier film or backing. The first substrate 12 provides the tensile strength to allow dispensing of the adhesive tape 10 from roll 21 and application of the tape 10 using manual or automated applications (not shown).

Suitable materials for the first substrate 12 may include: creped, non-creped, and release papers, polyethylene, polypropylene, polyethylene terephthalate (PET), un-plasticized vinyl chloride (UPVC), polyisobutylene, polyamides, cellulose acetate, copolymers of vinyl chloride and vinyl acetate, polyvinyl chloride, polyvinylidene chloride, polyvinyl butyral, polystyrene, polytrifluorochloroethylene, synthetic rubbers such as butadiene-styrene and ABS polymers, mono or biaxially oriented polypropylene films, polyester, PVC, release and other films, as well as foamed materials, wovens, knits, and nonwovens in web form made from polyolefins. The first substrate 12 may be a biaxially oriented carrier film. The first substrate 12 may be a composite film having two or more of the above materials. The composite film may have one or more layers or films. The first substrate 12 may be a film having a lower percentage of polypropylene resins, such as the films disclosed in co-pending U.S. patent application Ser. No. 13/934,629, which is incorporated by reference herein in its entirety.

In one embodiment, the first substrate 12 may be a transparent or translucent, such as a transparent or translucent film that allows the plurality of discrete pieces of substrate material 24 to be visible to the eye through the first substrate 12. A transparent or translucent first substrate 12 allows a would-be-tamperer to see the plurality of discrete pieces of second substrate material 24 and recognize the intended security feature these pieces provide, which may discourage the would-be-tamperer from tampering with the package.

In another embodiment, the first substrate 12 may be an opaque film such that the plurality of discrete pieces of substrate material 24 are not visible until after the first substrate 12 and first adhesive layer 14, collectively as subtape 11 (see FIG. 7), are peeled away from the plurality of discrete pieces of substrate material 24.

Figure 2:
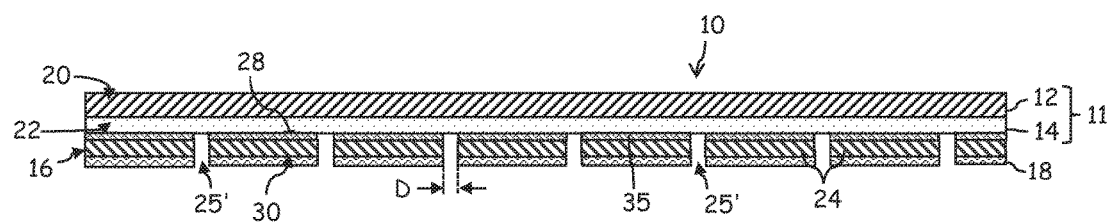
FIG. 2 is a longitudinal cross-sectional view, along line 2-2 of FIG. 1, of a first embodiment of a security tape, which differs from the embodiments in FIGS. 2 and 3 based upon the method of manufacturing.
Figure 3:
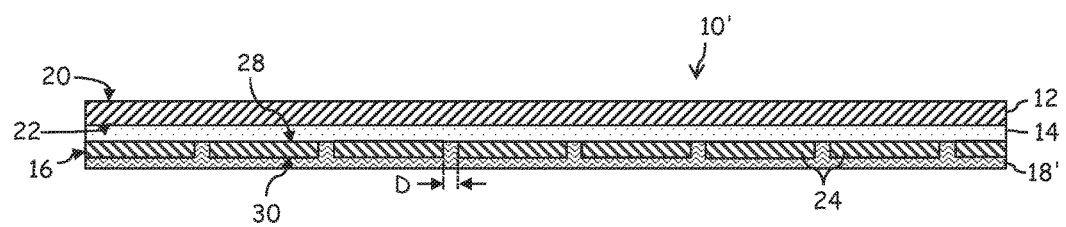
FIG. 3 is a longitudinal cross-sectional view, along line 2-2 in FIG. 1, of a second embodiment of a security tape.
Figure 4:
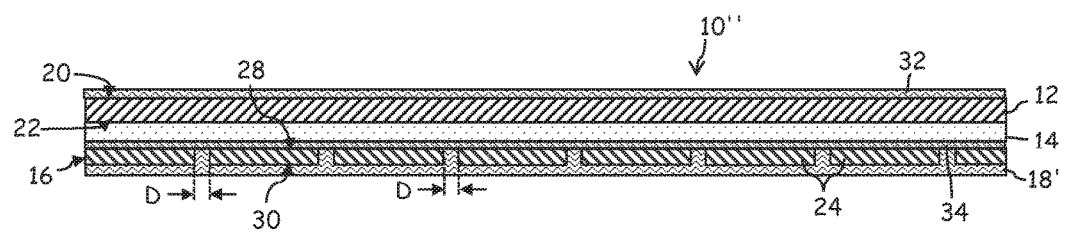
FIG. 4 is a longitudinal cross-sectional view, along line 2-2 in FIG. 1, of a third embodiment of a security tape.

As illustrated in FIG. 4, any of the security tapes 10, 10' and 10" may include a first release layer 32 as an optional layer, for example a silicone release coating, applied to the first major surface 20 of the first substrate 12 to allow the adhesive tape to be self-winding into rolls, and easily unwound therefrom. The release layer 32 is not limited to a silicone release coating, but may be any other suitable release system known to one of skill in the adhesive and/or tape art. Additionally, each of the plurality of discrete pieces of substrate material 24 may include a second release layer 34, for example a silicone release coating, applied to the first surface 28 thereof, which positions the second release layer 34 on the first adhesive layer 14 or release layer segments 35, as shown in FIGS. 4 and 2, respectively. The second release layer 34 is not limited to a silicone release coating, but may be any other suitable release system known to one of skill in the adhesive and/or tape art. The second release layer 34 may be included to change the surface energy of the plurality of discrete pieces of substrate material 24, thereby decreasing the adhesion between the first adhesive layer 14 and the plurality of discrete pieces of substrate material 24 such that the first substrate 12 and first adhesive layer 14 are separate as a unit (subtape 11 labeled in FIGS. 2 and 7) from the plurality of discrete pieces of substrate material 24, which remain adhered to an adherend, such as carton 38. The second release layer 34 may be present in addition to or as an alternative to the substrate material comprising a saturant.

The plurality of discrete pieces of substrate material 24 may be saturated with a saturant, especially when a paper is selected for the substrate material. The saturant may be applied by soaking, immersing, coating, and/or dipping with/in a saturant, or by other known methods.

The plurality of discrete pieces of substrate material 24 may be film or paper or may be composed of fibers or filaments. Examples of suitable film material include polyethylene, polypropylene, polyethylene terephthalate (PET), un-plasticized vinyl chloride (UPVC), polyisobutylene, polyamides, cellulose acetate, copolymers of vinyl chloride and vinyl acetate, polyvinyl chloride, polyvinylidene chloride, polyvinyl butyral, polystyrene, polytrifluorochloroethylene, synthetic rubbers such as butadiene-styrene and ABS polymers, mono or biaxially oriented polypropylene films, polyester, PVC, release and other films or combinations thereof. Examples of suitable paper material include creped and non-creped papers. Creped NBSK (Northern Bleached Softwood Kraft) paper web is one suitable backing for use in the security tape 10. Additionally, the plurality of discrete pieces of substrate material 24 may include foamed materials, woven materials, knit materials, and nonwoven materials in web form, which may be made from polyolefins or other of the above materials. The plurality of discrete pieces of substrate material 24 may be pre-treated with a chemical or physical surface pretreatment on one or both surfaces 28, 30 thereof, which may be an anti-adhesive treatment or coating on the first surface 28 facing the first adhesive layer 14.

Referring to FIGS. 2-7, the plurality of discrete pieces of substrate material 24 form a discontinuous second substrate layer 16 with the plurality of discrete pieces of substrate material 24 generally oriented transverse to the machine direction, i.e., the length of each piece is oriented generally in the transverse direction. Each discrete piece of substrate material 24 may be spaced apart a distance D in the machine direction from each immediately adjacent one of the discrete pieces 24. This distance D is in a range of about 0.5 mm to 20 mm. In one embodiment, the distance D may merely be the width of a cutting blade, which may make the distance appear to be zero, yet the substrate material is still present as separate, discrete pieces.

Figure 5:
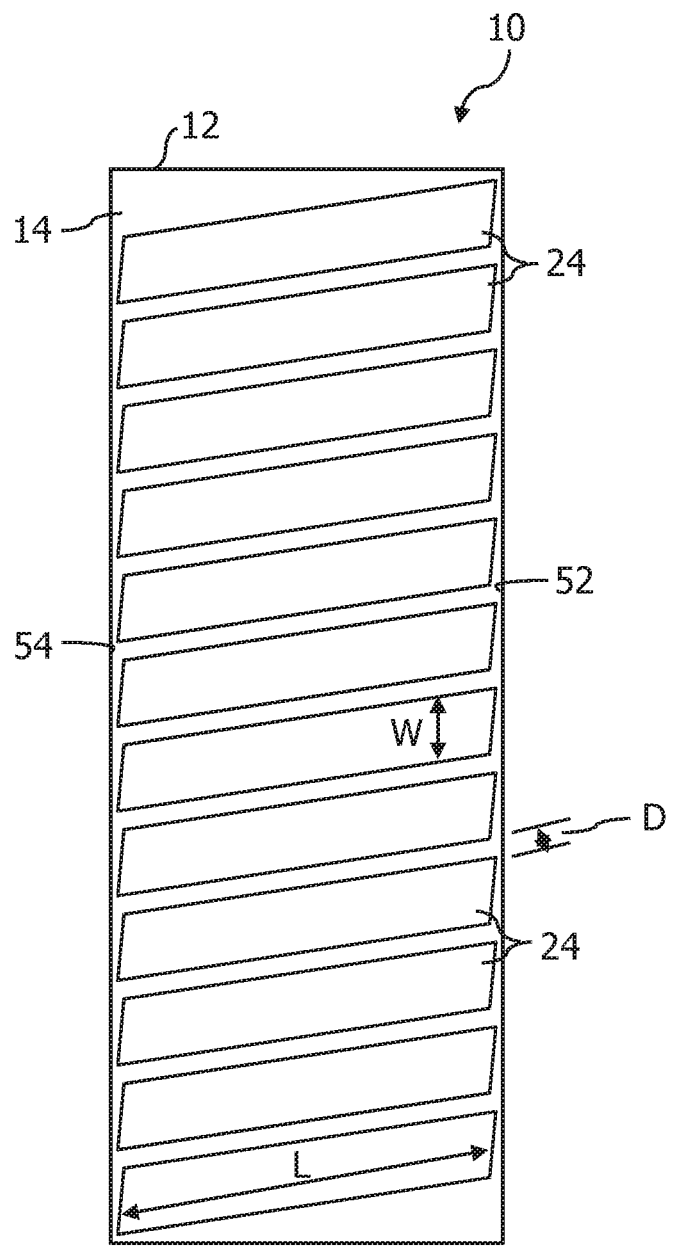
FIG. 5 is a top view of one embodiment of a security tape where the minitapes are visible through the tape backing.
Figure 6:
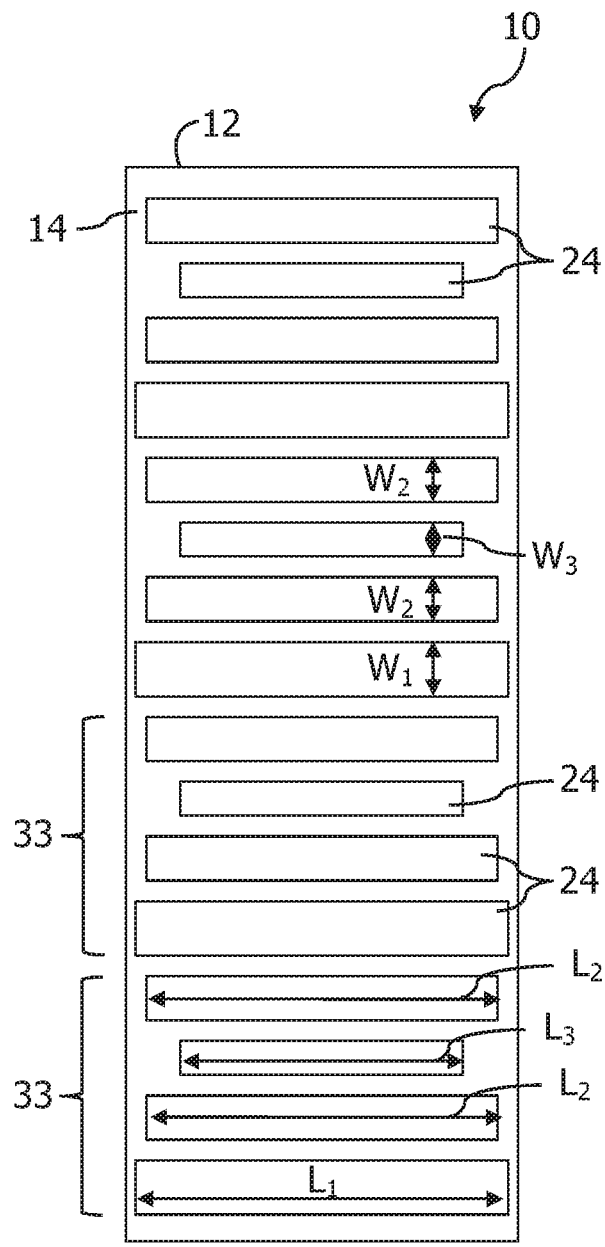
FIG. 6 is a top view of another embodiment of a security tape having a repeating pattern of varying length discrete pieces of second substrate visible through the tape backing.

Now referring to FIGS. 5 and 6, each of the plurality of discrete pieces of second substrate 24 may be characterized by a width W measured generally in the machine direction of the tape 10 and a length L measured generally transverse to the machine direction (cross-machine direction) of the tape 10, 10', 10", or vice versa depending upon the shape selected for the plurality of discrete pieces of second substrate. As seen in FIGS. 5 and 6, each of the plurality of discrete pieces of substrate material 24 may be substantially continuous in the cross-machine direction, i.e., extending from one edge 52 to an opposing edge 54 of the second surface 22 of the first substrate 12 or extending to within a distance of about 1 mm to about 10 mm, more preferably about 1 mm to about 4 mm, away from both of said edges 52, 54, respectively.

The discrete pieces of substrate material 24 may have any convenient geometric shape or may have a shape resembling a word, trademark, or other graphic symbol. In one embodiment, the plurality of discrete pieces of substrate material 24 all have the same shape, but in other embodiments they do not. In one embodiment, each discrete piece of substrate material 24 has a shape different than one or both of its immediately adjacent neighboring discrete pieces of substrate material. Each of the plurality of discrete pieces of substrate material 24 may have a similar shape but may have different sizes, size being characterized by the length L and/or width W of each discrete piece (as illustrated in FIG. 6). Any one or more of the plurality of discrete pieces of substrate material 24 may be a colored substrate material, where all may be the same color, or a plurality of colors may be used in a random or a patterned manner.

In the embodiment shown in FIG. 6, the plurality of discrete pieces of substrate material 24 are patterned with a regularly repeating pattern or code 33 by varying one or more of the shape, size (length and/or width), color, selected substrate material, topography, and number of the discrete pieces of substrate material 24 arranged in the machine direction along the tape. As shown in FIG. 6, the size of the discrete pieces of substrate material 24 changes by varying both the length L and the width W of the discrete pieces to create a regular pattern 33. Varying the pattern of the plurality of discrete pieces of substrate material 24 provides additional security to a package by making it more difficult to replicate, which makes it more difficult for a person tampering with the package to restore the package to its pre-tampering condition or appearance, in particular to have to replace each of the plurality of discrete pieces of substrate material 24 back across the seam 40 of the carton 38 after the first substrate has separated from the plurality of discrete pieces of substrate material 24. It is expected that the security tape 10 will have a deterrent effect with respect to tampering and unwanted intrusion into the package or carton as well, when the discrete pieces of substrate material 24 are visible through the first substrate 12.

A thickness of the first and second release layers 32, 34 may be minimized relative to thicknesses of the first substrate 12, first adhesive layer 14, plurality of discrete pieces of substrate material 24, and second adhesive layer 18 by applying the release layers 32, 34 via any of the conventional printing, coating or air-brushing techniques known in the art. Thickness is one mechanism for maintaining the aesthetics and the performance of the security tape and minimizing its direct material cost.

The first adhesive layer 14 and the second adhesive layer 18 are pressure sensitive adhesives. The first adhesive layer 14 and second adhesive layer 18 may be applied to the first substrate 12 and the plurality of discrete pieces of second substrate 24, respectively, as solvent-cast, aqueous, solventless, or molten films or as coating layers using extrusion, any manner of roll, knife, rod, or blade coating, curtain coating, or any other suitable method. The first and second adhesives 14, 18 can be cross-linked by means of heat or radiation. The first adhesive layer 14 may be applied to the first substrate at a thickness in the range of about 0.1 mil to about 2 mil, more preferably about 0.5 mil to about 1.0 mil. The second adhesive layer 18 may be applied to the plurality of discrete pieces of second substrate 24 with a thickness to the second surface 30 thereof in a range of about 0.1 mil to about 2.5 mil, more preferably about 0.5 mil to about 1.5 mil.

Pressure sensitive adhesives (PSA) are elastomeric-based adhesives that "wet out" at room temperature. When pressure is applied to the adhesive, it becomes flowable, thereby covering the substrate. As the pressure is removed, adhesion takes place. Typical varieties of PSAs are derived from natural rubber, synthetic rubber, acrylic, silicone and modifications thereof. The following adhesive compounds, solutions, or emulsions may be used, either alone or in combination, without departing from the scope of this invention. Suitable rubber-based adhesives may include, but are not limited to, natural rubber, synthetic polyisoprene, styrene-isoprene-styrene block copolymer (SIS), styrene-butadiene-styrene block copolymer (SBS), styrene-isoprene-butadiene-styrene block co-polymer (SIBS), styrene-ethylene-butylene-styrene block co-polymer (SEBS), styrene-ethylene-propylene-styrene block copolymer (SEPS), styrene butadiene rubber, nitrile rubber, neoprene rubber, butyral and butyl rubber, polyisobutylene, polysulfide rubber, silicone rubber, natural latex rubber, and synthetic latex rubber. Suitable resin-based adhesives may include, but are not limited to, polyvinyl acetate, polyvinyl butyral, polyvinyl chloride, acrylic, ethylene vinyl acetate, polyethylene-based, polyolefin-based, nylon-based, phenol-based (including formaldehyde-based), urea-based (including formaldehyde-based), epoxy resin, polyurethane-based, rosin-based (including rosin esters), polyterpene-based, polyester, petroleum-based, and low-molecular-weight based adhesives. Suitable inorganic adhesives include, but are not limited to, silicate adhesive and wax adhesives such as paraffin, natural wax, and bees wax.

The adhesives disclosed above may include one or more additives such as tackifiers (resins), plasticizers, fillers, pigments, ultraviolet (UV) absorbers, light stabilizers, aging inhibitors, crosslinking agents, and crosslinking promoters. Tackifiers are, for example, hydrocarbon resins (for example, those of unsaturated $C_5$ or $C_7$ monomers), terpene-phenolic resins, terpene resins formed from raw materials such as α- or β-pinene, aromatic resins such as coumarone-indene resins or resins of styrene or α-methylstyrene, such as rosin and its derivatives, such as disproportionated, dimerized or esterified resins, in which context it is possible to use glycols, glycerol, or pentaerythritol. Particularly suitable are aging-stable resins without an olefinic double bond, such as hydrogenated resins, for example.

Examples of suitable fillers and pigments may include, but are not limited to, carbon black, titanium dioxide, calcium carbonate, zinc carbonate, zinc oxide, silicates or silica.

Examples of suitable plasticizers include aliphatic, cycloaliphatic, and aromatic mineral oils, diesters or polyesters of phthalic acid, trimellitic acid or adipic acid, liquid rubbers (for example, nitrile rubbers or polyisoprene rubbers), liquid polymers of butene and/or isobutene, acrylic esters, polyvinyl ethers, liquid resins and plasticizer resins based on the raw materials for tackifier resins, wool wax and other waxes, or liquid silicones.

Examples of crosslinking agents are phenolic resins or halogenated phenolic resins, melamine resins and formaldehyde resins. Examples of suitable crosslinking promoters are maleimides, allyl esters such as triallyl cyanurate, and polyfunctional esters of acrylic and methacrylic acid.

In one embodiment, the pressure-sensitive adhesive is or includes acrylate PSAs (for example in dispersion form) or PSAs comprising styrene block copolymer and resin (for example, of the kind typical for hot melt PSAs). In another embodiment, the pressure-sensitive adhesive is or includes a natural rubber.

In all the embodiments, the first adhesive layer 14 adheres the first surface 28 of each of the plurality of discrete pieces of substrate material 24 to the second major surface 22 of the first substrate 12. Adhesion of each of the plurality of discrete pieces of substrate material 24 to the first substrate 12 via the first adhesive layer 14 is characterized as a first adhesion, which is a lower adhesion than that between the first substrate 12 and the first adhesive layer 14, which collectively is referred to as subtape 11. The second adhesive layer 18 adheres the second surface 30 of each of the plurality of discrete pieces of substrate material 24 to a carton 38 (see FIG. 7). Upon applying the security tape to the carton 38, which may be made of cardboard, a second adhesion is present, that of the plurality of discrete pieces of substrate material 24 to the carton. This second adhesion is greater than the first adhesion, but is less than the adhesion of the second adhesive layer 18 for each of the plurality of discrete pieces of substrate material 24 such that each individual discrete piece of substrate material 24 and its portion of the second adhesive is a unit, referred to as a minitape 15.

Figure 7:
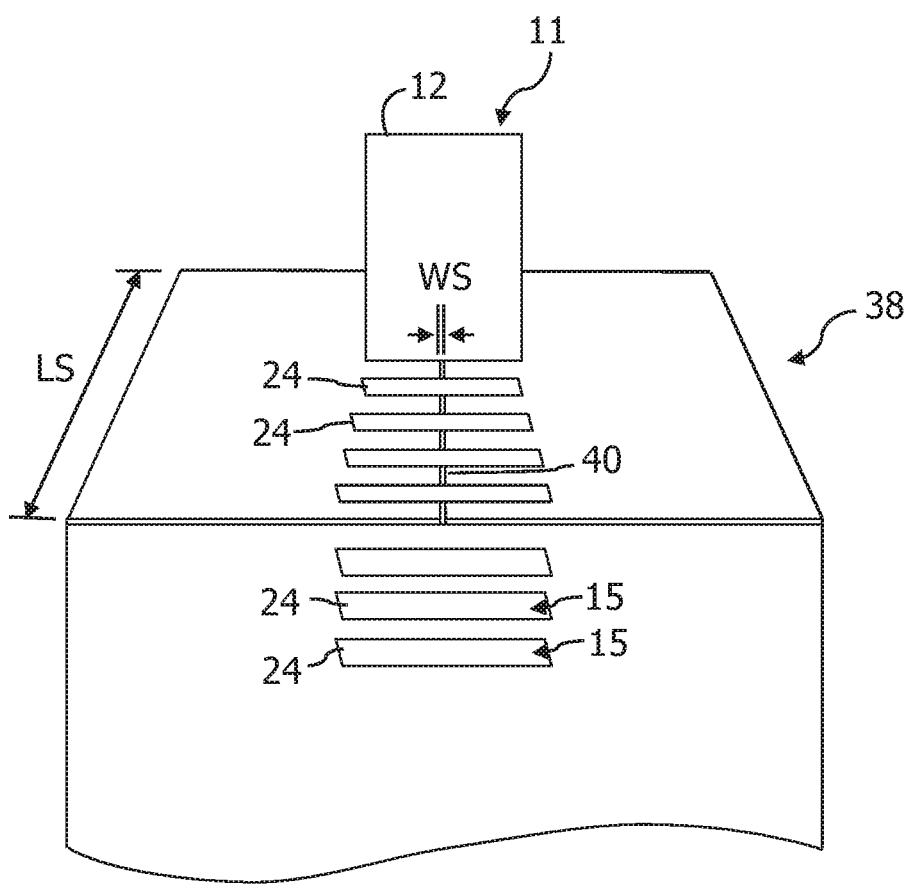
FIG. 7 is a side perspective view of a cardboard carton having one embodiment of a carton sealing tape adhered thereto, and partially pulled away from the carton.

Still referring to FIG. 7, having the second adhesion greater than the first adhesion enables the subtape 11 to be removed from the plurality of minitapes 15 formed by the plurality of discrete pieces of substrate material 24 when the minitapes 15 are adhered to the carton 38, in particular across a seam 40 thereof. A would-be-tamperer must now contend with the plurality of minitapes 15 that each must be removed (or split apart) to gain access to the interior of the carton, and that thereafter must be replaced to create the original condition of the tape. Further, the subtape 11 must be returned over the plurality of minitapes 15, which is nearly impossible without looking like it has been tampered with—especially since the delamination of the subtape 11 from the minitapes 15 tends to marr the exterior surface of the first adhesive layer 14 on subtape 11.

The first substrate 12 provides sufficient tensile strength to allow the dispensing of the security tape 10 from a roll (not shown) and subsequent application, via automatic or manual applicators (not shown), along a length LS of the carton 38 to construct or seal the carton 38. Once the security tape 10 is applied to the carton 38, the subtape 11 may be removed from the plurality of discrete pieces of second substrate 24, leaving the plurality of minitapes adhered to the carton 38 across the seam 40. Each of the minitapes 15 remains adhered to the carton 38, which may be made of cardboard, and provides strength across a width WS of the seam 40 to ensure a secure, tamper-resistant seal. Although the security tape 10 is shown as a carton sealing tape, it is understood that the security tape 10 may be used for other security tape applications involving other substrate materials.

In one embodiment, the second adhesive defining the second adhesive layer 18 is a different PSA having a different adhesion strength than the first adhesive defining the first adhesive layer 14. The difference in PSAs between the first adhesive and the second adhesive provides the difference in adhesion strength between the subtape 11 and the minitape 15 and the minitape 15 for an adherend, respectively. Referring back to FIG. 4, in another embodiment, the different adhesion strengths between the first adhesion and the second adhesion may be a result of the presence of the second release layer 34. Applying the second release layer 34 to the first surface 28 of each of the plurality of discrete pieces of substrate material 24 may decrease the first adhesion between the subtape 11 and the plurality of minitapes 15 to less than the second adhesion. The different adhesion strengths between the first adhesion and second adhesion may also be influenced by the materials selected for the first substrate 12 and the second substrate 26.

Additional layers of security may be provided by incorporating additional tamper indicators into the security tape 10 to provide evidence of intrusion or tampering. Indicia (not shown) may be printed on the second major surface 22 of the first substrate 12 using a low-surface energy substance prior to application of the first adhesive layer 14 to the first substrate 12. When the first substrate 12 is removed from the plurality of discrete pieces of substrate material 24, the low-surface energy indicia results in a message or indication, in the form of an adhesive residue, left behind on each of the plurality of discrete pieces of substrate material 24. The message or indication left behind indicates that the first substrate 12 was removed.

One or more taggant materials (not shown) may be incorporated into one or more of the first substrate 12, first adhesive layer 14, second adhesive layer 18, one or more of the plurality of discrete pieces of substrate material 24, first release layer 32 or second release layer 34 (if present), or in any major surface of any of the aforementioned layers, to provide additional indications of tampering. The taggant material may be visible to the human eye, or may be identifiable through microscopy, fluorescence, application of different frequencies of light, or other detection method.

Methods of making the security tape 10 disclosed herein include providing a first substrate 12 in the form of a continuous material in the machine and cross-machine direction, and applying a first adhesive layer 14 to a second major surface 22 of the first substrate 12 to define a subtape 11, or providing the subtape 11 with the first adhesive layer 14 already applied thereto. In one embodiment, to subtape 11, a second substrate 26 in the form of a continuous material in the machine direction and the cross-machine direction is laminated to the first adhesive layer 14 of the subtape 11 as depicted in part A of FIG. 8. Then, a die-cutting blade is activated to cut voids 25 in the second substrate 26 in the cross-machine direction as it moves in the machine direction, thereby defining a plurality of discrete pieces of substrate material 24 as the second substrate layer 16, as depicted in part B of FIG. 8. Finally, the second adhesive layer 18 is applied to the second major surface 30 of the plurality of discrete pieces of substrate material 24, using any one of the application methods discussed above, as depicted in part C of FIG. 8. The security tape that results has the structure depicted in FIG. 3. Subsequently, the security tape 10 may be wound onto a core to form a roll and the roll cut, trimmed, etc. into discrete rolls of security tape of desired dimensions. The method depicted in FIG. 8 may also include applying a release material to the first surface 20 of the first substrate 12, which may occur before laminating the second substrate 26 to the first adhesive layer 14 or at any point subsequent thereto, including after the application of the second adhesive layer 18. The method depicted in FIG. 8 may also include a saturating step for the second substrate 26 and/or a treating to impart release characteristics step, or applying a release layer step to the first surface of the second substrate 26 before the second substrate is laminated to the first substrate 12 by the first adhesive.

Figure 9:
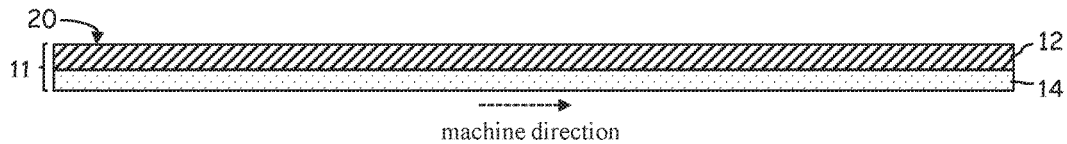
FIG. 9 is a flow diagram of a second method of making a security tape.
Figure 9:
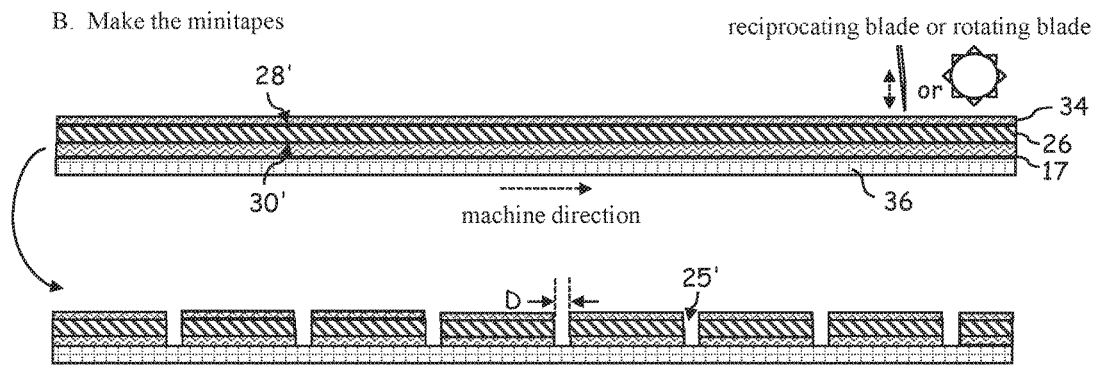
Figure 9:
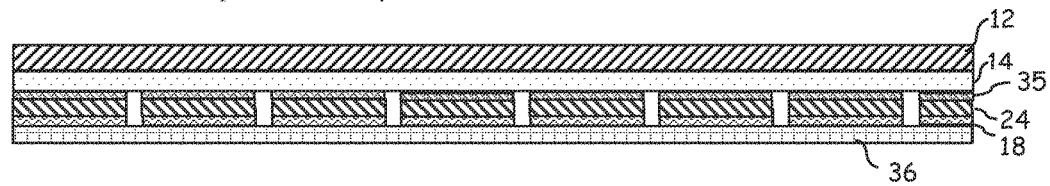
Figure 9:
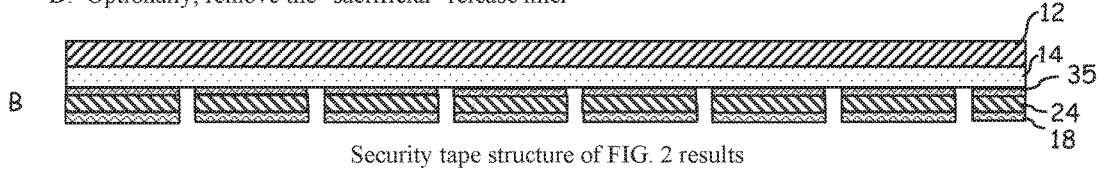

Now referring to FIG. 9, an alternate method is depicted that includes providing a first substrate 12 in the form of a continuous material in the machine and cross-machine direction, and applying a first adhesive layer 14 to a second major surface 22 of the first substrate 12 to define a subtape 11, or providing the subtape 11 with the first adhesive layer 14 already applied thereto (part A). In part B, a second substrate 26 in the form of a continuous material in the machine direction and the cross-machine direction that has a second adhesive layer 17 applied to a second major surface 30' thereof, which is a continuous layer of second adhesive material, is provided. The second substrate 26, optionally, has a release layer 34 applied to the first major surface 28' and a "sacrificial" release liner 36. The "sacrificial" release liner 36 maintains the plurality of discrete pieces of substrate material 24, cut adhesive layer 18, and cut release layer segments 35 in registration relative to one another after being cut by a reciprocating blade or rotatory blade die cutter and the excess material removed that defines distance D. This liner is referred to as "sacrificial" because after the minitapes are laminated to the subtape in the next step, the liner 36 may be removed and discarded. However, if desired, liner 36 could be left in place and removed by the end user after removing a segment of security tape from a roll.

A die-cutting blade is activated to cut a plurality of voids 25' in the second substrate 26 in the cross-machine direction as it moves in the machine direction, thereby defining a plurality of discrete pieces of substrate material 24 as the second substrate layer 16, as depicted in part B of FIG. 9. Any excess material cut by this process that is not part of the plurality of discrete pieces of substrate material 24 is removed and discarded to form a continuous strip of minitapes adhered to the "sacrificial" release liner 36.

As mentioned above, the strip of minitapes is laminated by the first adhesive layer 14 of the subtape 11 to the release layer 34, if present, or to the first major surface 28' of the minitapes, as depicted in part C of FIG. 9. The security tape that results has the structure depicted in FIG. 2. Subsequently, the security tape 10 may be wound onto a core to form a roll and the roll cut, trimmed, etc. into discrete rolls of security tape of desired dimensions. The method depicted in FIG. 9 may also include applying a release material to the first surface 20 of the first substrate 12, which may occur before laminating the second substrate 26 to the first adhesive layer 14 or at any point subsequent thereto. The method depicted in FIG. 9 may also include a saturating step for the second substrate 26 and/or treating to impart release characteristics or applying a release layer to the first surface 28' of the second substrate 26 before the second substrate is laminated to the first substrate 12 by the first adhesive.

Figure 8:
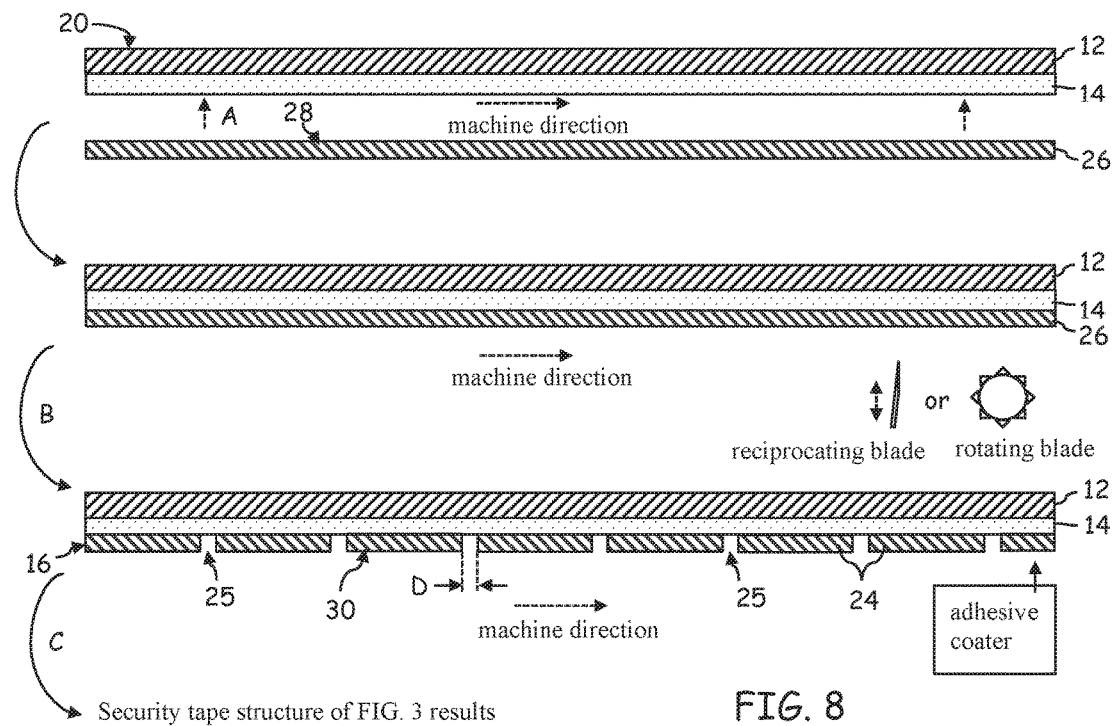
FIG. 8 is a flow diagram of a first method of making a security tape.

The voids 25, 25' in FIGS. 7 and 8 are defined by a distance D cut into the second substrate 26 or the second substrate 26 and second adhesive layer 17, collectively, by the die-cutting blade(s). The distance D may be the width of a single straight blade, a shape defined by a dual blade knife where the blades are spaced apart the distance D, or the result of a geometrically-shaped blade that defines the distance D for the voids 25, 25' running in the cross-machine direction, and may also define voids running in the machine direction along what will be the edges 52, 54 of the first substrate after rolls of selected dimensions are cut, as shown in FIG. 5.

Figure 10:
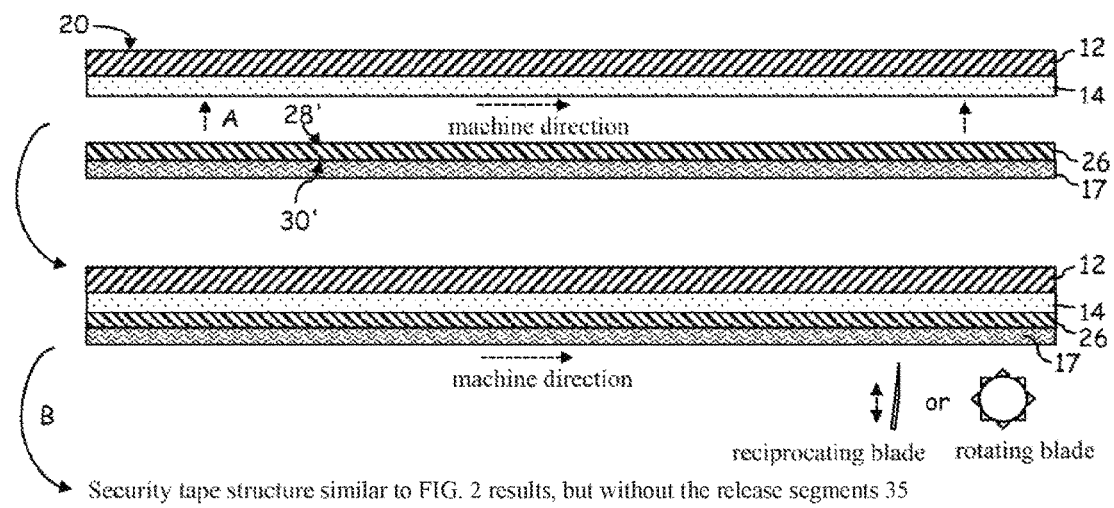
FIG. 10 is a flow diagram of a third method of making a security tape.

Now referring to FIG. 10, an alternate method is depicted that includes providing a first substrate 12 in the form of a continuous material in the machine direction and cross-machine direction, applying a first adhesive layer 14 to a second major surface 22 of the first substrate 12 to define a subtape 11, or providing the subtape 11 with the first adhesive layer 14 already applied thereto. Additionally, the method includes providing a second substrate 26 in the form of a continuous material in the machine direction and the cross-machine direction that has a second adhesive layer 17 applied to a second major surface 30' thereof, which is a continuous layer of second adhesive material, and laminating the first major surface 28' of the second substrate 26 to the first adhesive layer 14 of the subtape 11 as depicted in part A of FIG. 10. Then, a die-cutting blade is activated to cut a plurality of voids 25' in the second substrate 26 in the cross-machine direction as it moves in the machine direction, thereby defining a plurality of discrete pieces of substrate material 24 as the second substrate layer 16, as depicted in part B of FIG. 10. The security tape that results has the structure depicted in FIG. 7. Subsequently, the security tape 50 may be wound onto a core to form a roll and the roll cut, trimmed, etc. into discrete rolls of security tape of desired dimensions. The method depicted in FIG. 10 may also include applying a release material to the first surface 20 of the first substrate 12, which may occur before laminating the second substrate 26 to the first adhesive layer 14 or at any point subsequent thereto. The method depicted in FIG. 10 may also include a saturating step for the second substrate 26 and/or treating to impart release characteristics, or applying a release layer to the first surface 28' of the second substrate 26 before the second substrate is laminated to the first substrate 12 by the first adhesive.

The security tapes 10 disclosed herein provide multiple levels of security against tampering with packages. Certain aspects of the security tapes 10 may provide a deterrent effect on tampering. The security tapes 10 may also provide tamper indicia providing notice to a user that tampering has occurred. The security tape 10 may also provide a novel appearance that can be used for brand recognition.

It will be appreciated that while the invention has been described in detail and with reference to specific embodiments, numerous modifications and variations are possible without departing from the spirit and scope of the invention as defined by the following claims.

What is claimed is:

1. A security tape comprising:
   a backing having a first major surface and a second major surface;
   a first adhesive applied to the second major surface of the backing;
   a security layer adhered to the first adhesive, wherein the security layer includes a plurality of discrete pieces of paper oriented transverse to a machine direction of the security tape extending across the backing and between opposed edges of the backing, wherein each of the plurality of discrete pieces of paper is spaced a distance apart in the machine direction from each immediately adjacent one of the plurality of discrete pieces of paper;
   a second adhesive applied to the security layer, wherein a first adhesion of the first adhesive between the backing and the security layer is less than a second adhesion of the second adhesive between the security layer and an adherend;
   wherein the backing and the first adhesive are peelable away from the security layer after the tape is adhered to the adherend; and
   wherein peeling the backing mars the first adhesive or leaves adhesive residue on the plurality of discrete pieces of paper which hinders replacement of the backing.

2. The security tape of claim 1, wherein the distance apart is the width of a cutting blade.

3. The security tape of claim 1, wherein the distance apart is less than 5 mm.

4. An adhesive security tape comprising:
   a first substrate continuous in both a machine direction and a transverse direction and having a first major surface covered with a first pressure sensitive adhesive to form a subtape;
   a plurality of discrete pieces of second substrate laminated to the first major surface of the first substrate by the first pressure sensitive adhesive, wherein each of the plurality of discrete pieces of second substrate have a length oriented in the transverse direction extending across the first substrate in the transverse direction and between opposed edges of the first substrate;
   a second pressure sensitive adhesive applied to each of the plurality of discrete pieces of second substrate on a first surface opposite the first substrate to form a plurality of minitapes; and
   wherein a first adhesion of the first pressure sensitive adhesive for each of the plurality of discrete pieces of second substrate is less than a second adhesion of the second pressure sensitive adhesive on each of the plurality of discrete pieces of second substrate for an adherend;
   wherein the subtape is peelable away from the minitapes after the adhesive tape is adhered to the adherend; and
   wherein peeling the subtape mars the first pressure sensitive adhesive or leaves adhesive residue on the minitapes which hinders replacement of the subtape.

5. The adhesive security tape of claim 4, wherein each of the plurality of discrete pieces of second substrate are spaced a distance apart, in the machine direction, from each immediately adjacent discrete piece of second substrate.

6. The adhesive security tape of claim 4, wherein the adherend is cardboard.

7. The adhesive security tape of claim 4, wherein the first substrate is selected from the group consisting of biaxially oriented polypropylene, polyethylene terephthalate, unplasticized vinyl chloride, and polyethylene.

8. The adhesive security tape of claim 4, wherein each of the plurality of discrete pieces of second substrate is a paper.

9. The adhesive security tape of claim 4, wherein each of the plurality of discrete pieces of second substrate is a saturated paper.

10. The adhesive security tape of claim 4, wherein each of the plurality of discrete pieces of second substrate includes one or more of a filament, fiber, or polymeric film.

11. The adhesive security tape of claim 4, wherein the first substrate has a first release layer applied to a second major surface thereof, the second major surface facing in a direction opposite the first major surface.

12. The adhesive security tape of claim 4, wherein each of the plurality of discrete pieces of second substrate has a second release layer applied to a second surface of the discrete piece of second substrate, said second surface facing towards the first substrate, wherein the second release layer is positioned between each of the plurality of discrete pieces of second substrate and the first adhesive.

13. The adhesive security tape of claim 4, wherein the first major surface of the first substrate includes a low surface-energy indicia printed thereon such that removal of the first substrate from the plurality of discrete pieces of second substrate reveals the indicia in the form of the adhesive residue on one or more of the plurality of discrete pieces of second substrate.

14. The adhesive security tape of claim 4, further comprising:
    a taggant applied to one or more of the first substrate, the first pressure sensitive adhesive, one or more of the plurality of discrete pieces of second substrate, the second pressure sensitive adhesive, a first release coating, and a second release coating, wherein the taggant is identifiable through at least one of microscopy, fluorescence, and application of one or more frequencies of light and wherein the taggant is visible by a human eye.

15. The adhesive security tape of claim 4, wherein the first substrate is a transparent film.

16. The adhesive security tape of claim 4, wherein one or more of the plurality of discrete pieces of second substrate form a repeating pattern of one or more variations in shape, width, length, color, material, and topography.

17. The adhesive security tape of claim 4, wherein, once the adhesive tape is applied to a seam of a cardboard carton, the first substrate is removable from the plurality of discrete pieces of second substrate without removing the plurality of discrete pieces of second substrate from the cardboard carton.

18. The adhesive security tape of claim 17, wherein, upon removal of the first substrate, the plurality of discrete pieces of second substrate remain intact and adhered to the cardboard carton across the seam.

19. The adhesive security tape of claim 4, wherein peeling the subtape mars the first pressure sensitive adhesive and leaves the adhesive residue on the minitapes which hinders the replacement of the subtape.

20. An adhesive security tape comprising:
    a first substrate continuous in both a machine direction and a transverse direction and having a first major surface covered with a first pressure sensitive adhesive to form a subtape;
    a plurality of discrete pieces of second substrate laminated to the first major surface of the first substrate by the first pressure sensitive adhesive, wherein each of the plurality of discrete pieces of second substrate have a length oriented in the transverse direction extending across the first substrate in the transverse direction and between opposed edges of the first substrate;

a second pressure sensitive adhesive applied to each of the plurality of discrete pieces of second substrate on a first surface opposite the first substrate to form a plurality of minitapes; and wherein a first adhesion of the first pressure sensitive adhesive for each of the plurality of discrete pieces of second substrate is less than a second adhesion of the second pressure sensitive adhesive on each of the plurality of discrete pieces of second substrate for an adherend;

wherein the subtape is peelable away from the minitapes after the adhesive security tape is adhered to the adherend;

wherein peeling the subtape mars the first pressure sensitive adhesive or leaves adhesive residue on the minitapes which hinders replacement of the subtape; and a taggant applied to one or more of the first substrate, the first adhesive, one or more of the plurality of discrete pieces of second substrate, the second adhesive, a first release coating, and a second release coating, wherein the taggant is identifiable through at least one of microscopy, fluorescence, and application of one or more frequencies of light.

* * * * *